June 1, 1937.                    T. F. BRANDT                    2,082,046
                                BUSHING INSULATOR
                              Filed Sept. 24, 1935

Inventor:
Thomas F. Brandt
By Alpheus J. Crane
Attorney

Patented June 1, 1937

2,082,046

UNITED STATES PATENT OFFICE 2,082,046

BUSHING INSULATOR

Thomas F. Brandt, Barberton, Ohio, assignor to The Ohio Brass Company, Mansfield, Ohio, a corporation of New Jersey Application September 24, 1935, Serial No. 41,879

7 Claims. (Cl. 173—318)

This invention relates to bushing insulators for use in connection with tanks or housings for electrical apparatus where the housings are filled with oil or other insulating liquid.

One object of the invention is to provide a bushing insulator in which the parts are held together by a spring to insure tight joints and to permit differential expansion of the metal and dielectric parts, the bushing being provided with means to prevent the oil in the bushing from becoming contaminated by the oil in the housing.

A further object of the invention is to provide a bushing insulator which may be readily assembled, which is easily installed and which is of improved construction and operation.

Other objects and advantages will appear from the following description.

The invention is exemplified by the combination and arrangement of parts shown in the accompanying drawing and described in the following specification, and it is more particularly pointed out in the appended claims.

Figure 1:
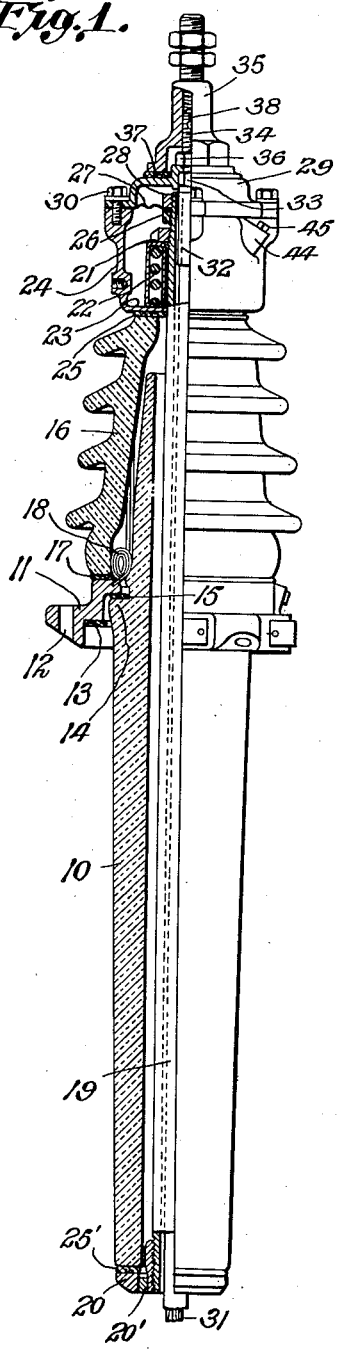
Fig. 1 is part elevation and part section showing one form of the present invention.

Referring first to Fig. 1, the numeral 10 designates a dielectric sleeve which may be made of porcelain or other suitable insulating material, the sleeve being provided with a metal flange 11 which fits upon an opening through the top of the housing for electrical apparatus, such as transformers or switches. The flange is secured in place by bolts through the openings 12 and a gasket 13 is provided to form a tight joint between the flange and housing. The sleeve 10 is provided with a shoulder 14 upon which the flange 11 rests, a gasket 15 being interposed between the shoulder and the metal flange. An upper cone 16 surrounds the upper portion of the sleeve 10 and rests upon the upper face of the flange 11, a gasket 17 being provided to form a tight joint between the lower end of the cone and the flange. An insulated flux control member 18 is connected with the flange 11 for controlling the electrostatic field about the flange, as more fully explained in the patent to Ralph Higgins No. 1,972,-590, Sept. 4, 1934. The parts are held together by means of a tubular stress member 19 secured at its lower end to a fitting 20 which bears upon the lower end of the sleeve 10 and at its upper end by a fitting 21 supported by a helical spring 22. The spring 22 rests upon the bottom flange 23 of an expansion chamber 24 carried on the upper end of a cone 16. A gasket 25 is interposed between the top of the cone and the bottom of the expansion chamber, and a gasket 25' is interposed between the fitting 20 and the lower end of the sleeve 10 to insure a tight joint at the bottom of the sleeve. The fitting 20 may have a perforation extending through it to assist in filling and draining, the perforation being normally closed by a pipe plug 26'.

In assembling the device, the parts thus far described are put together and the spring 22 compressed by a suitable jig, and the nut 21 tightened against the upper end of the spring. When the spring 22 is released, it will exert tension on the stress member 19 and draw the parts together against the gaskets 15, 17, 25 and 25' and thus insure tight joints at these points at all times. The spring 22 will compensate for differential expansion or contraction of the metallic member 19 and the dielectric members 10 and 16, which may be of porcelain or other suitable insulating material. A baffle plate 27 of thin flexible material is placed over the opening in the top of the expansion chamber 24 and is centrally perforated to receive the upper end of the stress member 19. The baffle plate 27 is held in position on the tension member 19 by means of nuts 26 and 28 at opposite sides of the baffle plate, suitable gaskets being interposed between the plate and the nuts to insure a tight joint at this point. A cover plate 29 is secured to the top of the expansion chamber 24 by cap screws 30, the cover plate resting on the outer periphery of the baffle 27, and suitable gaskets being used to insure a tight joint about the outer periphery of the gasket. The baffle may be made of corrugated sheet metal or other flexible material which will permit movement of the upper end of the tension member 19 relative to the outer wall of the expansion chamber, due to expansion and contraction of the tension member, and yet maintain a liquid tight closure over the upper end of the expansion chamber. The conductor cable 31 is provided at its upper end with a terminal member 32 soldered onto the end of the cable and having a non-circular portion 33 which fits into a similarly formed recess in the bottom face of the cover 29. The fitting 32 is provided with a threaded extension 34 which projects through a perforation in the cap 29 and receives the bushing terminal 35. A nut 36 is threaded on the projecting extremity of the fitting 32 to hold the cable in place when the bushing terminal 35 is removed. A gasket 37 insures a tight joint between the housing 29 and the terminal 35; the threaded opening in the terminal 35 for the threaded extension 34 being a blind opening.

In assembling the bushing after the cover 29 is in place, the cable is threaded through the stress member 19 until the portion 33 is seated in its opening in the cover 29. The nut 36 is then screwed into place and the terminal 35 is threaded onto the extension 34 of the cable. When it is desired to install the bushing, it is only necessary to remove the terminal 35 and the nut 36 and drop the cable through the bushing and out at the lower end; any suitable draw line being first attached to the opening 38 in the upper end of the cable extension 34. The lower end of the cable is attached to the apparatus in the housing and the bushing may then be installed and the lead drawn up through the bushing by means of the draw line, the nut 36 tightened and the terminal 35 screwed into place. This will insure good electrical connection between the terminal 35 and the conductor cable and also form a liquid tight closure for the bushing.

When the bushing is first assembled, the space within the sleeve 10, cone 16 and the expansion chamber 24 is filled with insulating oil, drawn up through the opening for the plug 20' by means of a suction device applied to the opening for the plug 45. When the bushing is installed the interior of the tension member 19 will be in communication with the oil inside the apparatus housing and this oil will extend up into the space above the baffle 27 but will be prevented from escaping by means of the bushing terminal 35 and gasket 37. It will be seen in this way that the oil in the bushing is completely isolated from the oil in the apparatus housing by means of the baffle 27. This prevents any contamination of the oil in the bushing which would cause deterioration. The oil in the bushing is entirely sealed off and is not subject to any influence tending to cause deterioration, so that it will maintain its dielectric properties substantially indefinitely. The oil in the apparatus housing may be subject to electric arcs, moisture or other influences which are injurious to the electrical properties but the baffle 27 insures complete separation between the two bodies of oil and prevents contamination of the oil in the bushing while permitting free relative expansion and contraction of the bushing parts, due to temperature changes.

Figure 2:
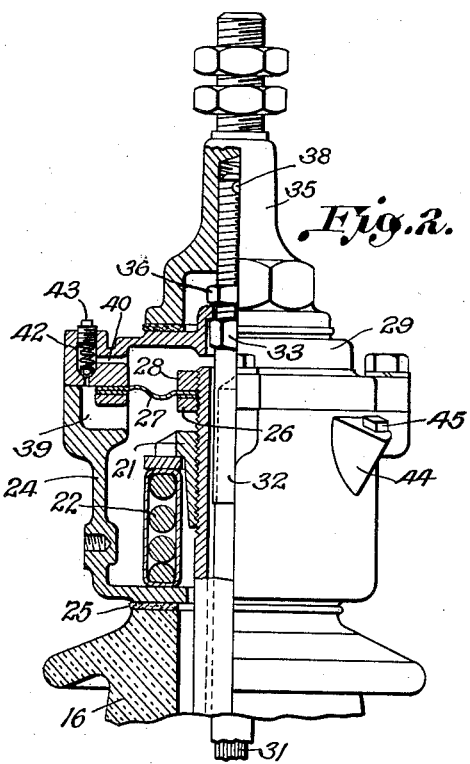
Fig. 2 is part elevation and part section of the upper portion of the bushing showing a slightly modified form of the invention.

The form of the invention shown in Fig. 2 is similar to that in Fig. 1 except that means is provided for by-passing the oil about the edge of the baffle 27. This consists of registering ports 39 and 40 in the upper portion of the expansion chamber 24 and in the cover plate 29 respectively, the parts being controlled by a ball valve 41 held in place by a spring 42 and a pipe plug 43. This will relieve any excess pressure within the bushing 16 but will prevent entrance of oil from the apparatus housing into the bushing. If it, for any reason, should be desirable to provide for free communication between the oil in the bushing and the oil in the housing, this may be done by removing the plug 43, spring 42 and valve 41, leaving a free by-pass about the baffle 27. Of course the same result could be accomplished by removing the baffle 27 entirely but after the bushing is once installed, it would be easier to remove the valve than it would be to remove the baffle. An opening may be provided through a boss 44 for filling the bushing, the opening being covered by a suitable plug 45.

I claim:

1. A bushing insulator comprising a pair of dielectric members, a stress member within said dielectric members having a passage therethrough, a spring cooperating with said stress member to hold said dielectric members together, said dielectric members having space therein in addition to said passage, said passage being open to permit communication with the interior of a housing for electrical apparatus, and means for sealing off said passage from the additional space within said bushing to exclude fluid in said passage from the additional space within said dielectric member, said sealing-off means providing for relative movement between said stress member and one of said dielectric members.

2. A bushing insulator comprising a pair of dielectric members, a stress member for holding said dielectric members together, said stress member having a passage therethrough arranged to communicate with the interior of a housing on which said insulator is mounted, said dielectric members having space therein outside of said passage, and a flexible baffle for preventing flow of fluid from said passage to said additional space while providing for movement of one end of said stress member relative to said dielectric members.

3. A bushing insulator comprising a pair of dielectric members, a stress member for holding said dielectric members together, a spring cooperating with said stress member for exerting pressure on said dielectric members, said stress member having a passage therethrough for a conductor, said passage being arranged to communicate with the interior of a housing for electrical apparatus on which said bushing is mounted, said passage being open at both ends to accommodate said conductor, a housing about one open end of said passage and a flexible baffle connecting said housing with said stress member to separate fluid within said passage from other portions of the interior of said bushing.

4. A bushing insulator comprising a pair of dielectric members, a tubular stress member for holding said dielectric members together, a spring cooperating with said tubular stress member for exerting pressure on said dielectric members, said tubular stress member being connected at its lower end to one of said dielectric members and having its upper end communicating with the interior of said housing, and a flexible baffle connecting the upper end of said stress member with said housing and providing for movement of said upper end relative to said housing, said baffle being positioned to exclude fluid in said passage from space within said dielectric members outside of said passage.

5. A bushing insulator comprising a pair of dielectric members, a tubular stress member for holding said dielectric members together and providing for a conductor to be drawn through said dielectric members, said tubular stress member being open at its lower end and adapted to communicate with the interior of a housing for electrical apparatus on which said bushing insulator is mounted, an expansion chamber surrounding the upper end of said tubular stress member, said tubular stress member being open at its upper end to permit the cable to be drawn therethrough, and a flexible baffle having liquid tight connection with said tubular stress member and with the wall of said housing and separating the passage through said stress member from the space within said bushing insulator outside of said stress member.

6. A bushing insulator having a plurality of chambers therein, one of said chambers being adapted to communicate with the interior of said housing on which said bushing is mounted, a baffle to prevent communication between said chambers, and a by-pass having a valve therein permitting passage of fluid past said baffle toward the chamber having communication with said housing but preventing passage of fluid in the opposite direction.

7. A bushing insulator having a tubular member extending therethrough for receiving a conductor lead, said tubular member being adapted to communicate with the interior of a housing on which said insulator is mounted, said insulator having space therein outside of said tubular member, an expansion chamber mounted on said insulator and communicating with said outside space, a flexible baffle connecting one end of said tubular member with the wall of said expansion chamber to prevent liquid from said housing from entering the space within said bushing insulator outside of said tubular member, and means for by-passing liquid about said baffle from the space within said insulator outside of said tubular member to the interior of said tubular member but preventing passage of liquid in the opposite direction.

THOMAS F. BRANDT.